W. W. ROGERS.
SCALE.
APPLICATION FILED MAY 31, 1919.

1,335,604.

Patented Mar. 30, 1920.
2 SHEETS—SHEET 1.

Witnesses
E. R. Cuppert.

Inventor
W. W. Rogers
By Victor J. Evans
Attorney

W. W. ROGERS.
SCALE.
APPLICATION FILED MAY 31, 1919.
1,335,604.
Patented Mar. 30, 1920.
2 SHEETS—SHEET 2.
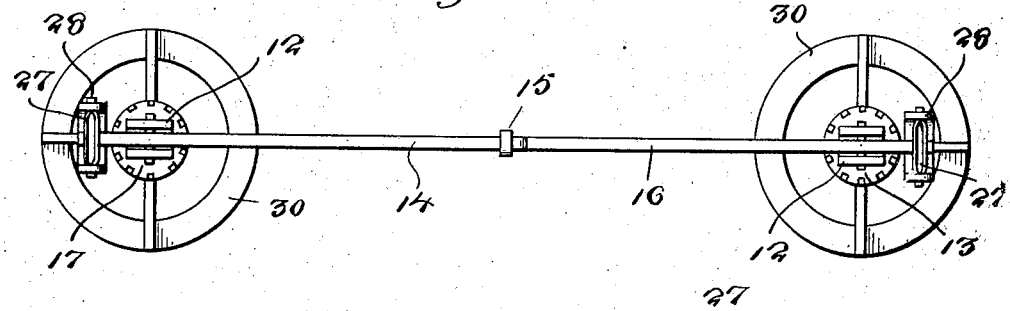
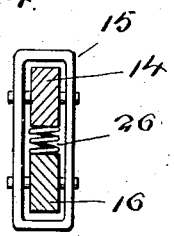
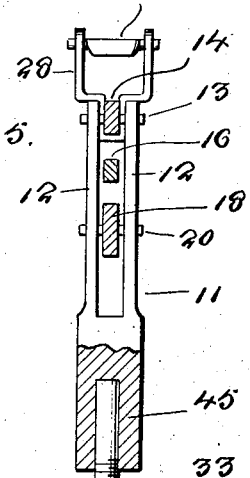
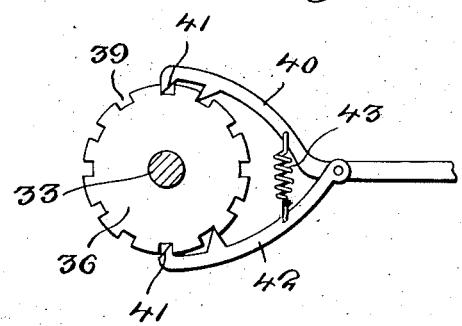
Witnesses
E. R. Ruppert
Inventor
W. W. Rogers
By Victor J. Evans
Attorney

UNITED STATES PATENT OFFICE.

WILLIAM W. ROGERS, OF HERMISTON, OREGON.

SCALE.

1,335,604.  Specification of Letters Patent.  Patented Mar. 30, 1920.

Application filed May 31, 1919. Serial No. 300,858.

*To all whom it may concern:*

Be it known that I, WILLIAM W. ROGERS, a citizen of the United States, residing at Hermiston, in the county of Umatilla and State of Oregon, have invented new and useful Improvements in Scales, of which the following is a specification.

This invention relates to improvements in scales and has for its object the provision of a portable scale primarily intended to be used for weighing vehicles, such as wagons, trucks and the like.

Another object is the provision of a portable scale, which may be positioned beneath a wagon or truck to elevate the same for the purpose of determining the weight of the load, provision being made for properly leveling the load to evenly distribute the weight.

Another object is the provision of a novel form of supporting standard for the scale, which permits of the latter being adjusted to adapt the scale to a wide variety of uses.

A further object is the provision of novel weight supporting elements carried by the scale levers, which may be positioned beneath the vehicle to properly distribute the load for weighing.

Other objects and advantages of the invention will appear as the following description is read in connection with the accompanying drawings.

In the drawings:

Fig. 3 is a plan view.

Fig. 4 is a central vertical sectional view.

Fig. 5 is a vertical section through one of the standards and lifting jacks.

Fig. 6 is a view illustrating the means whereby the jacks may be adjusted.

Referring to the drawings in detail, like characters of reference denote corresponding parts throughout the several views.

Figure 1:
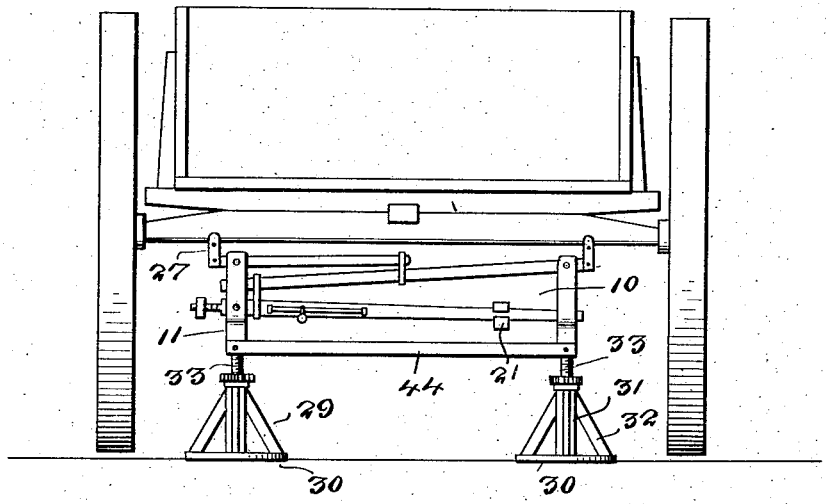
Figure 1 is a rear elevation of a fragmentary portion of a vehicle showing a pair of scales in position for use.
Figure 2:
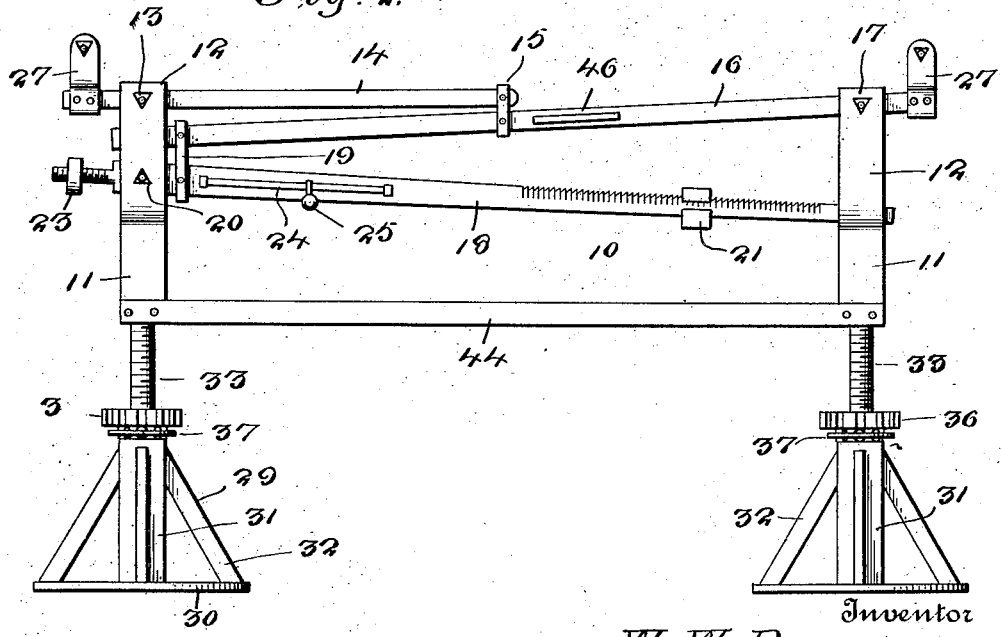
Fig. 2 is a side elevation of one of the scales.

The invention is herein described and shown for the purpose of weighing the contents or load of a vehicle and for this purpose a pair of scales is positioned beneath the vehicle, but it is to be understood that the scales are capable of being used singly. There is, therefore, illustrated in the drawings, a fragmentary position of a vehicle having positioned therebeneath near each side thereof, a scale indicated generally by the reference character 10. This scale comprises a pair of spaced standards 11, whose upper ends are bifurcated, or provided with a pair of spaced arms 12. Pivotally mounted between the arms 12 of one of the standards, as indicated at 13, is a bar 14, the said bar extending to a point approximately central of the distance between the standards 11 and having pivotally connected thereto, by means of links 15, a bar 16. This last mentioned bar is pivotally mounted between the arms 12 of the opposite standard 11, as indicated at 17, and is of sufficient length to have its free end extend between the arms 12 of the first mentioned standard. The free end of the bar 16 is pivotally connected to a scale beam 18 by means of links 19, the connection being near the free end of the bar 16.

The scale beam 18 is pivotally mounted between the arms of one of the standards, as shown at 20, and is of sufficient length to permit of its free end operating between the arms of the opposite standard. The beam 18 is suitably graduated, and has slidably mounted thereon a weight 21, as is usual in this class of devices. The short arm 22 of the beam 18 is provided with a counter-poise 23 in the form of a threaded weight, so as a proper balance of the beam may be obtained. The beam 18 is further provided with an auxiliary beam 24 of any usual or desired construction, having slidably mounted thereon an auxiliary weight 25. Located between the bars 14 and 16, and between the latter and the beam 18, are counter-poise springs 26.

Mounted upon the outer ends of the bars 14 and 16, are weight supporting elements. These elements are in the form of saddles 27, which are curved, as shown, and are pivotally mounted in oppositely extending outwardly curved arms 28, bolted or otherwise secured to the bars. These saddles serve as supports to the load and are adapted to be placed beneath the vehicle axles.

The standards 11 are capable of adjustment, so as to permit of the saddles 27 being positioned beneath the vehicle axles and the vehicle raised to determine the amount of the load. For this purpose there is positioned beneath each of the standards and forming a continuation of the same, a jack 29. This jack embodies a relatively large supporting base 30, upon which is mounted a standard 31, the latter being braced by diagonal braces 32. Mounted for sliding movement in the standard 31, is a jack screw 33, the said screw being held against rotation by a head 34, which operates in a guide socket 35 provided in the standard 31. Mounted upon the jack screw is a nut 36, which when rotated, will raise or lower the screw. Interposed between the under-face of the nut 36 and the top of the standard 31, is a bearing plate 37. This plate carries a plurality of radially disposed frusto-conical bearing rollers 38, upon which the nut 36 revolves, so as to reduce friction. The nut 36 is provided with spaced notches 39, which are engageable with a ratchet wrench 40, the latter being provided with lugs 41, which engage the said notches. One arm of the wrench 40 is pivotally mounted upon the handle, as shown at 42, and is held against outward movement by means of a spring 43, so as to provide means for disengaging and engaging the lugs 41 from the notches during the operation of raising or lowering the jack screw.

It is preferred to connect the standards 11 by means of a bar 44, so that the bars and beams of the scale proper will be held together when the said scale is removed from the jack for the purpose of transportation or storage. As the jack screws 33 enter sockets 45 provided in the bottom of the standards 11, this disengagement may be readily effected.

In determining the weight of a vehicle one of the scales is positioned upon each side of the vehicle beneath the axles, the latter resting in the saddles 27. The nuts 36 are then rotated to raise the vehicle from contact with the ground, the raising being effected by means of the ratchet wrench 40 in the manner previously described. In order to bring the saddles 27 in proper horizontal alinement to evenly distribute the weight of the load, the bar 14 carries a spirit level 46, which is adjusted to indicate this level. The weight is then obtained by moving the weights along the beam in the usual manner.

The invention is susceptible of various changes in its form, proportions and minor details of construction and the right is herein reserved to make such changes as properly fall within the scope of the appended claims.

Having described the invention, what is claimed is:

1. A scale comprising a pair of spaced standards, balance levers pivotally secured thereto, weight supporting means located at the outer ends of said levers, a scale beam pivotally mounted in one of said standards and connected to one of said levers, lifting jacks located beneath each of said standards to regulate the height of the weight supporting means and means for obtaining the proper level of said weight supporting means.

2. A scale comprising a pair of spaced standards, balance levers pivotally secured thereto, weight supporting means located at the outer ends of said levers, a scale beam pivotally mounted in one of said standards and connected to one of said levers, lifting jacks located beneath each of said standards to regulate the height of the weight supporting means and means carried by one of said levers for obtaining the proper level of the weight supporting means.

3. A scale comprising a pair of spaced standards, balance levers pivotally secured thereto, weight supporting means located at the outer ends of said levers, a scale beam pivotally mounted in one of said standards and connected to one of said levers and means for regulating the height of each of said standards.

4. A scale comprising a pair of spaced standards, balance levers pivotally secured thereto, weight supporting means located at the outer ends of said levers, a scale beam pivotally mounted in one of said standards and connected to one of said levers, a detachable supporting base for each of said standards and a regulating screw connecting each standard and base.

5. A scale comprising a pair of spaced standards, balance levers pivotally secured thereto, pivotally mounted weight supporting saddles located at the outer ends of said levers, a scale beam pivotally mounted in one of said standards and connected to one of said levers and means carried by the standards for obtaining the proper level of the weight supporting saddle.

In testimony whereof I affix my signature.

WILLIAM W. ROGERS.